UNITED STATES PATENT OFFICE.

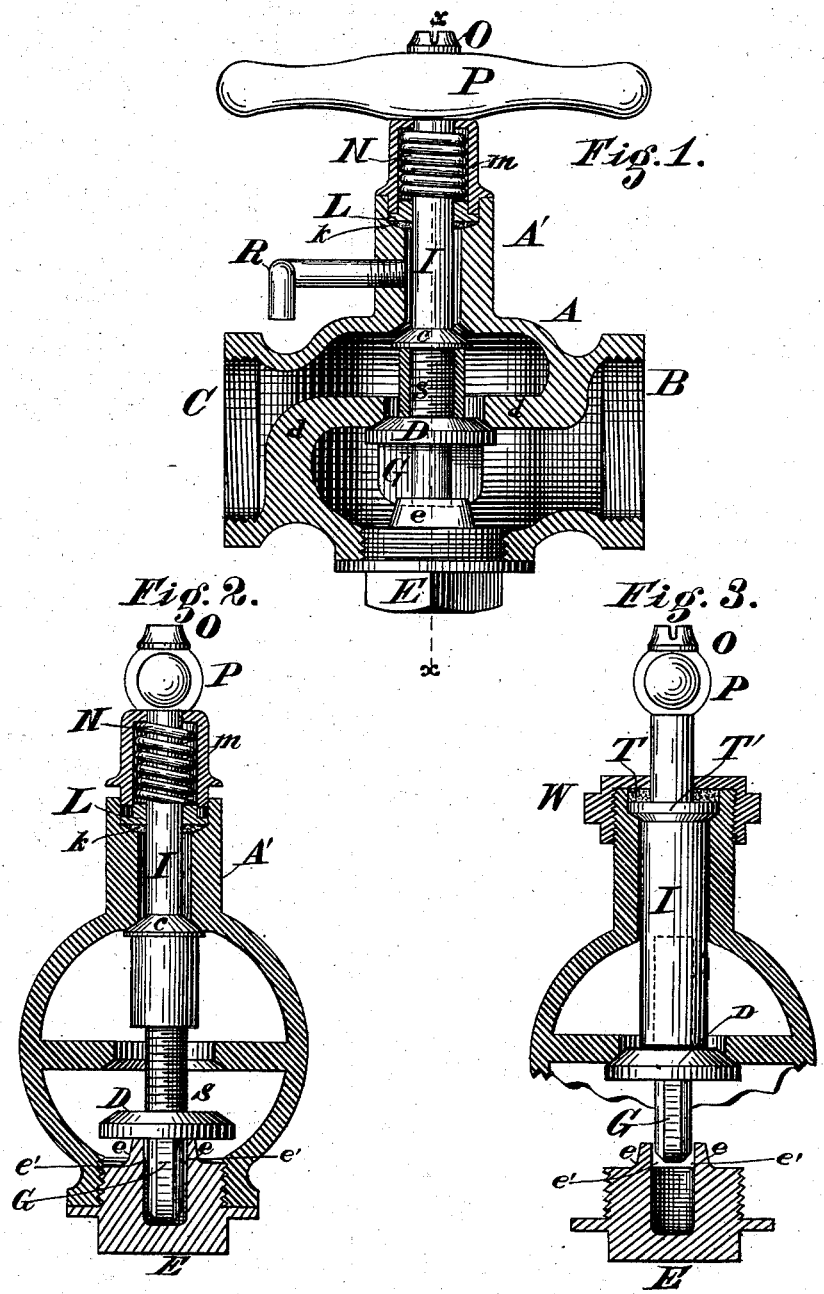

JOSEPH RICHTER, OF CINCINNATI, OHIO.

VALVE-COCK.

SPECIFICATION forming part of Letters Patent No. 263,223, dated August 22, 1882.

Application filed March 18, 1882. (No model.)

*To all whom it may concern:*

Be it known that I, JOSEPH RICHTER, a citizen of the United States, and a resident of Cincinnati, in the county of Hamilton and State of Ohio, have invented certain new and useful Improvements in Valve-Cocks, of which the following is a specification.

My invention relates to improvements in globe-valves and compression-cocks, and has for its object to provide a valve which seats against its valve-seat in the direction of the fluid-pressure; to provide novel and efficient means for preventing the valve from rotating, but permitting its vertical movement toward and from its valve-seat; to enable the valve-seat to be reground by grasping a depending projection or wing and rotating the valve while in contact with its seat; to provide a novel construction of valve-stem, with a valve for opening and closing the waste-passage of the cock while the main valve is fixed on its seat. These objects I accomplish by the construction, arrangement, and combination of parts illustrated in the accompanying drawings, in which—

Figure 1 is a central vertical section of my improvement, showing the waste-valve open and the cut-off valve closed. Fig. 2 is a transverse view of Fig. 1, showing the valves in the reverse position. Fig. 3 is a central cross-section, showing a modification of my improved valve and stem applied as a globe-valve for steam purposes.

A represents a common globe-valve chamber; B, the inlet, and C the outlet, divisions.

D is a disk-valve seating on the under side of partition d.

E represents a screw-plug tapping into the chamber A vertically under the valve D.

e represents guides or lugs extending up from plug E and made integral therewith, between which is an angular guideway, e'.

G represents an angular projection or wing extending down from the valve D and working loosely in the space e'. The object of these projections from the valve D and plug e is to prevent the valve D from rotating, and yet allow it to rise and fall vertically. This method of seating the valve D allows it to be easily reground by simply removing the plug E and applying tongs to the wing G and turning the valve D in its seat in partition d. Valve D is provided with a stem, S, having a male screw-thread. I represents a secondary stem, having a series of female threads cut in the bore thereof, and which engage with the threads on stem S.

A' represents the sleeve of the valve-chamber, in the bore of which the stem I of the valve loosely rests, there being a sufficient space around stem I to form a waste-passage. At the lower end of the stem is provided a seat for a secondary waste-valve, c.

K represents a packing on collar L, which surrounds the upper end of stem I, which serves as a stuffing-box to prevent leakage and as a bearing for stem I to journal in.

m represents a housing for spring N; P, a handle rigidly secured to stem I by a screw, O.

When valve-stem I is turned to unscrew or separate the parts I and S the valve D drops vertically, stem I simply rotating in its journal. If it is desired to open the waste, stem I is turned till the valve D rests on the ledges e. Then stem I is turned still farther, and the screw-threaded stems will coil or retract spring N and strain the stem I and its secondary valve c downward and open the waste-passage and allow it to run off through pipe R. Hence by rotating stem I the valve D only may be opened; or by turning farther, as explained, the waste may be opened, and it may be cut off without opening the main cut-off valve. The advantages of this construction are numerous and render it an effective compression-valve for hydrant purposes.

When it is desired to use my valve for steam purposes only it is preferably made as shown in Fig. 3. In this case the stem I is provided with a seat, T, packing T', and screw-cap W, to form a steam-tight metal packing. The collar T, being made of metal and seated in the upper end of the journal of stem I, will turn freely on its seat. This construction is very advantageous. As the valve D seats with the pressure, the stem I and its stuffing-box may be removed and reground or repacked without trouble. By using the compound screw-stem I S the valve D is enabled to be seated with the pressure and opened by the unscrewing of the stem, as before described, and this is a very important feature of my invention.

I do not broadly claim a valve raised and lowered by a two-part male and female threaded valve-stem and the male part of the stem carrying a valve to close a waste-water passage when the main valve is raised from its valve-seat; nor do I broadly claim a valve seating against its valve-seat in the direction of the fluid-pressure.

I claim—

1. The combination, substantially as herein described, of the valve-chamber A, the non-rotating valve D, seating against its valve-seat in the direction of the fluid-pressure, and provided with the externally-threaded stem S, and the internally-threaded stem I, provided with a waste-valve, c, seating against a sleeve on the valve-chamber, for the purpose described.

2. The combination, with the valve-chamber A, provided with the sleeve A', housing m, and inclosed spring N, of the internally-threaded stem I, having a waste-valve, c, seating against the sleeve, the valve D, seating against its valve-seat in the direction of the fluid-pressure, and the externally-threaded valve-stem S, substantially as and for the purpose described.

3. The combination, with the valve-chamber A, provided with the sleeve A' and detachable plug E, having the angular guideway e', the housing m, inclosed spring N, valve-stem I, provided with the waste-valve c, seating against the sleeve of the valve-chamber, the valve D, seating against its valve-seat in the direction of the fluid-pressure, and provided with the angular depending projection G, arranged in the guideway of the detachable plug, and the externally-threaded valve-stem S, substantially as described.

4. A compression-cock combining in its structure a valve-chamber, A, provided with a sleeve, A', a housing, m, adapted to slide vertically on the latter, a spring, N, within the housing, a valve-stem, I, connected with the housing, and provided with a waste-valve, c, seating in the bore of the sleeve, a valve, D, seating against its valve-seat in the direction of the fluid-pressure, and provided with a valve-stem, S, independent of but engaging the valve-stem carrying the waste-valve, said members being organized to operate substantially as and for the purpose set forth.

In testimony whereof I have hereunto set my hand in the presence of two subscribing witnesses.

JOSEPH RICHTER.

Witnesses:
 JNO. E. JONES,
 CORNELIUS BYL.